Nov. 29, 1932.  S. HICE  1,889,736
LOADING DECK FOR AUTOMOBILES
Original Filed May 13, 1930  2 Sheets-Sheet 2
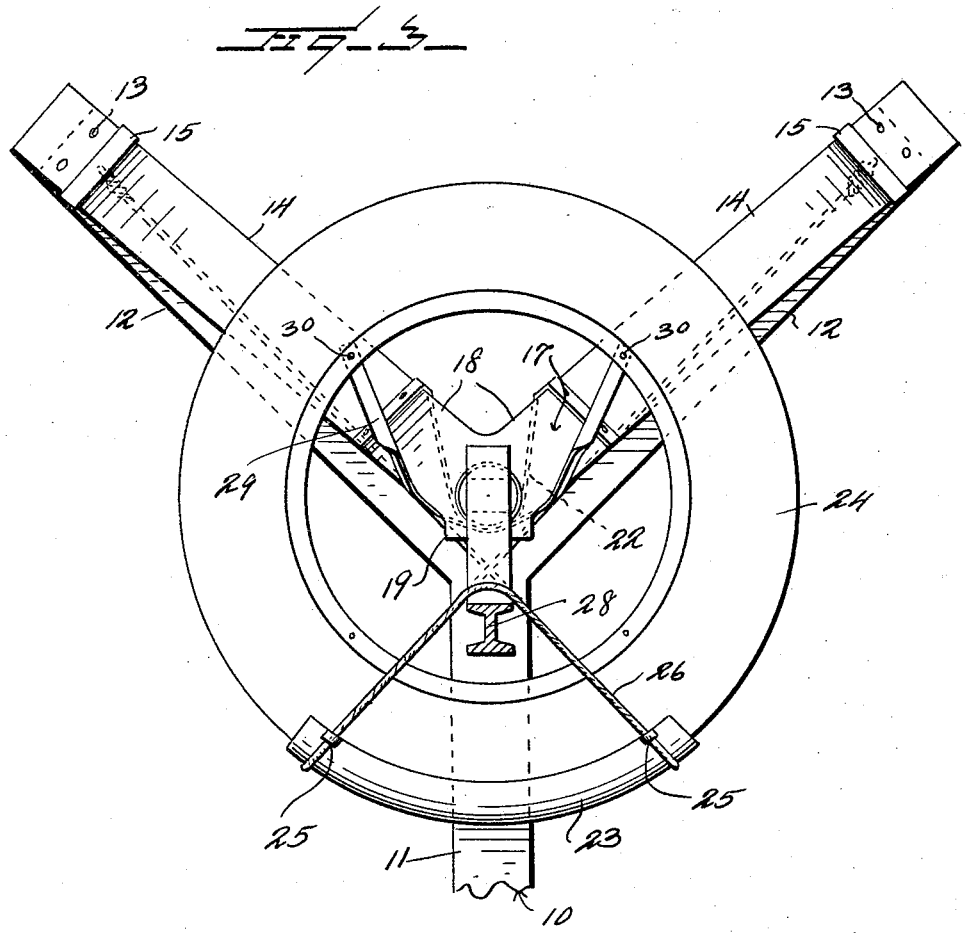
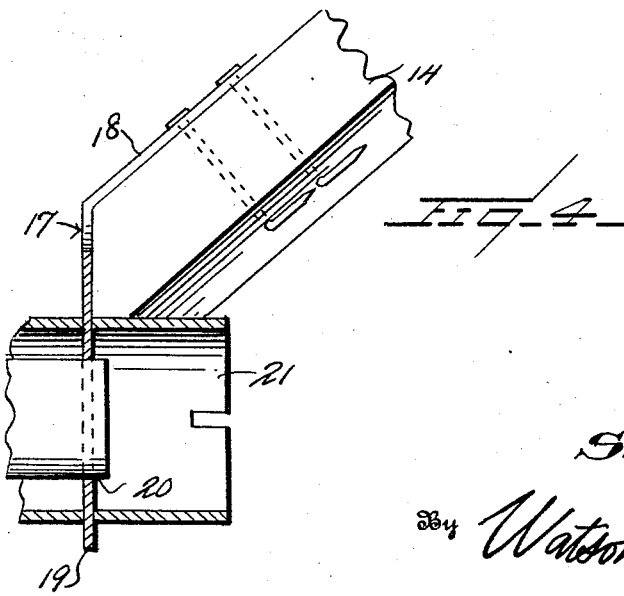
Inventor
S. Hice
By Watson E. Coleman
Attorney Patented Nov. 29, 1932

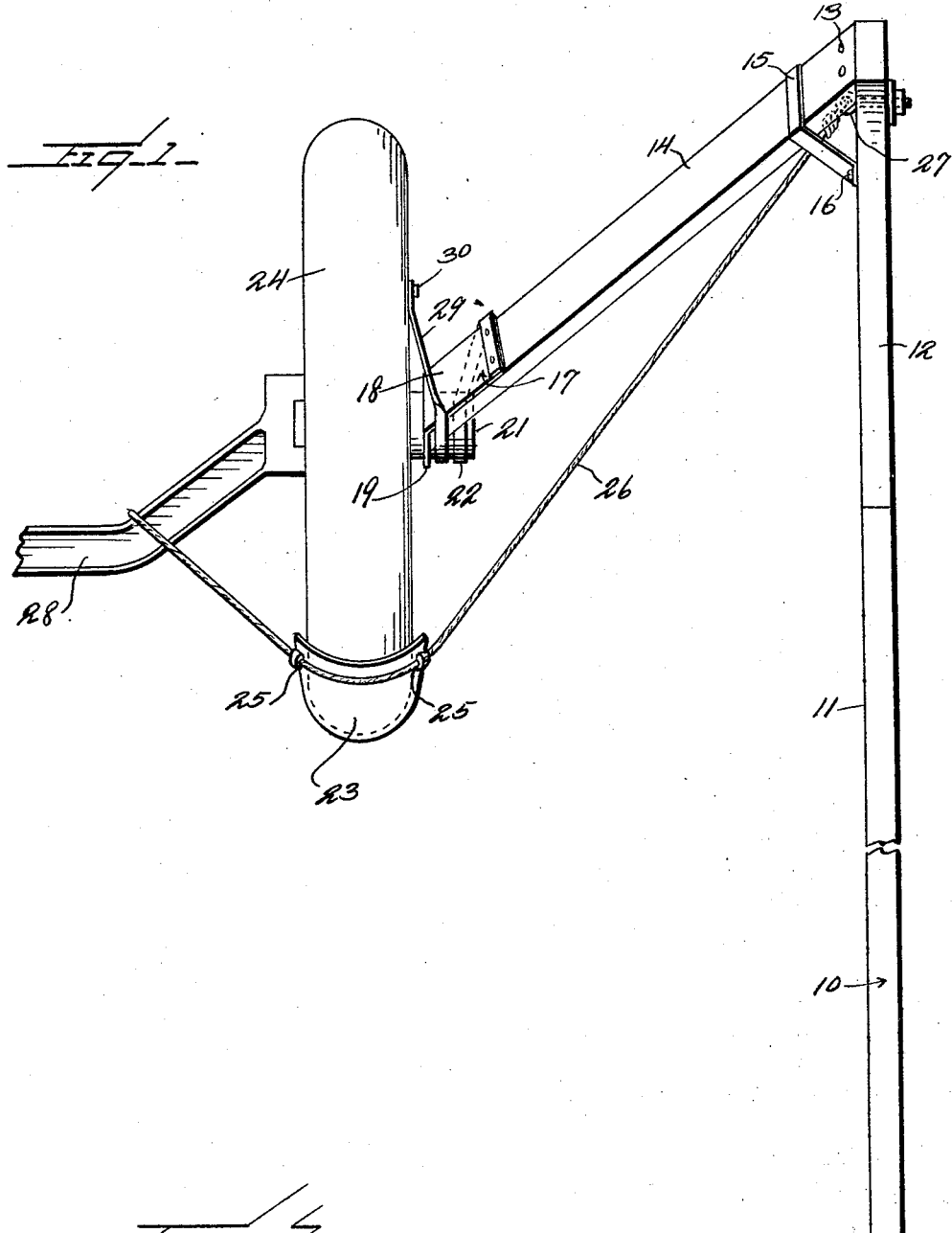

1,889,736

UNITED STATES PATENT OFFICE

SHERMAN HICE, OF DETROIT, MICHIGAN, ASSIGNOR, BY MESNE ASSIGNMENTS, TO EVANS PRODUCTS COMPANY, A CORPORATION OF DELAWARE

LOADING DECK FOR AUTOMOBILES

Application filed May 13, 1930, Serial No. 452,052. Renewed November 12, 1931.

The present invention relates to loading decks for motor vehicles or the like and has for an important object thereof the provision of a loading deck by means of which the vehicle may be securely supported within a freight car so as to prevent injury to the vehicle through jars or bumps consequent to the movement of the freight car.

Another object of this invention is to provide a loading deck by means of which the motor vehicle may be loaded within the car in completely assembled condition, the deck being so constructed as to support the vehicle with the tires and fenders applied or positioned on the vehicle, the deck engaging the wheels of the vehicle with the tires positioned thereupon so as to eliminate the necessity of removing the tires, wheels and fenders as is the custom at present.

A further object of this invention is to provide a loading deck for motor vehicles which is adapted to not only hold the vehicle in spaced relation to the floor of the freight car so as to permit the placement of another vehicle beneath the supported vehicle but also to hold the supported vehicle in spaced relation to the sides of the freight car and thereby support the vehicle against lateral or longitudinal jars or bumps.

The above and various other objects and advantages of this invention will in part be described in and in part be understood from the following detailed description of the present preferred embodiment, the same being illustrated in the accompanying drawings wherein:—

Figure 1 is a detail front elevation of a device constructed according to the preferred embodiment of this invention;

Figure 2 is a fragmentary detail elevation of the shoe member;

Figure 3 is a fragmentary side elevation partly in section of the device; and

Figure 4 is a sectional view partly in detail taken substantially through the center of the bracing members.

Referring to the drawings wherein like numerals of reference designate corresponding parts throughout the several views, the numeral 10 designates generally a supporting frame which is adapted to be secured to one of the side walls or vertical supports in a freight car or the like, the frame 10 comprising a lower member 11 and a pair of upper diverging supporting members 12, the upper members 12 and the lower member 11 comprising a substantially Y shaped frame member which may be bolted or otherwise secured to the freight car.

A pair of converging bracing members 14 are secured at the upper end portions thereof by means of nails or bolts 13 or the like to the upper or free ends of the diverging members 12 and the bracing members 14 are adapted to depend from the members 12 in angular relation thereto.

The bracing members 14 are also secured to the supporting members 12 by means of a strap 15 or the like which is positioned about the surface of the bracing member 14 and secured to the supporting members 12 by means of bolts, nails or the like 16.

A Y shaped hub engaging member generally designated as 17 is secured to the converging ends of the bracing members 14, the hub engaging member 17 comprising a pair of angularly inclined arms 18 and a depending hub engaging portion 19 which is preferably angularly disposed with respect to the arms 19 and preferably positioned in substantially vertical position or in parallel relation to the supporting member or frame 10. The depending portion 19 is provided with an aperture 20 therethrough which is adapted to engage the spindle or hub of the motor vehicle so as to hold the body of the vehicle away or in spaced relation to the frame 10. A hub cap engaging member 21 is adapted to be positioned about the hub cap or hub of the motor vehicle and the cap member 21 is held dependingly from the converging ends of the bracing members 14 by means of a strap 22 which is bolted or otherwise secured to the bracing members 14.

A supporting shoe 23 is adapted to be positioned on the lower surface of the tire 24 of the motor vehicle, the shoe 23 being constructed in the form of a segment of a circle and is provided with spaced slots 25 therethrough for receiving a supporting strap or cable 26, the flexible member 26 being secured adjacent the upper end portion of the supporting members 12 by means of adjustable eye bolts 27 or the like and depending downwardly therefrom.

The supporting member 26 is looped about the axle 28 of the motor vehicle so that the axle of the motor vehicle will cooperate with the supports 12 so as to hold the motor vehicle in spaced relation to the floor of the car.

Through the provision of the segmental member or shoe 25 it is possible to load the motor vehicle in the freight car or the like with the wheel and tire applied thereupon, and by means of the angularly inclined bracing members 14 it is also possible to retain the fenders upon the vehicle notwithstanding the fact that the fenders protrude or extend outwardly from the wheel. The shoe member 23 cooperates with the tire so as to cushion the shocks caused by movement of the freight car and the bracing members 14 will hold the vehicle within the car against lateral swinging movement, it being of course understood that most of the jars or shocks which occur are caused by longitudinal movement so that it is not necessary to provide cushioning means for cushioning the lateral or swinging movement of the vehicle.

The wheels of the motor vehicle are held upon the bracing members 14 against circumferential movement by means of a strap or bar 29 which extends about the cap member 21 and is secured at the free ends thereof to the rim bolts 30 or the like. If desired, a turnbuckle or the like may be interposed in the supporting cable or member 26 so that suitable tension may be placed upon the cable for supporting the vehicle.

In the use of the loading deck herein disclosed the frame 10 is adapted to be bolted or otherwise secured to the wall of the freight car or a vertically disposed supporting member and the motor vehicle may be driven or otherwise positioned in the car whereupon it may be hoisted upwardly so that the hub portions thereof will engage the hub engaging member 17. While the vehicle is held in this position by the hoisting apparatus the shoe member 25 may be positioned on the bottom of the tire and the cable or flexible member 26 passed over the axle 28 of the vehicle at a point inwardly from the tire or wheel 24 and through the eyelets 25 on the shoe. The free ends of the flexible member 26 may then be secured to the eye bolts 27 and properly adjusted so that the shoe 25 will firmly engage the tire 24.

It will, of course, be understood that the loading deck herein disclosed may be used to support either one end of the motor vehicle or to support both ends of the vehicle and that when the vehicle is positioned upon the deck the tires and springs of the motor vehicle will cooperate with the supporting structure of the deck to cushion the shocks of the freight car.

It will be obvious from the foregoing that the side walls of the freight car will stand the stress or strain occasioned by jarring of the freight car while in transit or the like, the bracing members 14 cooperating with the flexible member 26 so as to transfer the stress from the vehicle and frame of the device to the side of the freight car. It will also be obvious that any strain or stress of a lateral nature will be placed upon the walls of the freight car but that notwithstanding any lateral stress the motor vehicle suspended from the structure herein disclosed will be maintained in desired spaced relation to the side walls of the freight car.

It will also be understood that various changes and modifications may be made in the details of construction and design of the above specifically described embodiment of the invention without departing from the spirit thereof, such changes and modifications being restricted only by the scope of the following claims.

What is claimed is:—

1. A loading deck of the character described comprising a frame, vehicle supporting means secured to said frame and engaging the frame of a motor vehicle whereby to support the vehicle from the frame, and bracing means outstanding from the frame and engaging the vehicle whereby to hold the vehicle in spaced relation to the frame.

2. A loading deck of the character described comprising a frame having a pair of diverging upper end portions, a tire engaging shoe, flexible means secured to said upper end portions of said frame and engaging said shoe, said flexible means being also adapted to engage the vehicle whereby to swingingly support said vehicle from said frame, and bracing means depending from said frame and engaging said vehicle whereby to hold said vehicle outwardly of said frame.

3. A loading deck of the character described comprising a frame, said frame comprising a vertically disposed supporting member and a pair of diverging members secured to the upper end portion of said vertical member, an arcuately inclined shoe adapted to engage an applied tire secured to a motor vehicle, adjustable flexible means carried by said diverging members and engaging said shoe and said vehicle whereby to support said vehicle, and a pair of converging bracing members dependingly secured to said diverging members and engaging said vehicle whereby to hold said vehicle in spaced relation to said frame.

4. A vehicle loading deck of the character described comprising a Y shaped frame, a supporting shoe adapted to engage the applied tire of the motor vehicle, a flexible member secured to said frame and engaging said shoe and the vehicle whereby to hold said shoe against the tire of the vehicle, a pair of converging bracing members secured to the upper end portion of said frame, a Y shaped plate secured to said bracing members and depending therefrom, said Y shaped member having an aperture therethrough adapted to engage the vehicle for holding said vehicle in spaced relation to said frame, and a strap carried by said bracing member and engaging the wheel of the vehicle whereby to hold said wheel against circumferential movement upon said shoe.

5. A vehicle supporting device of the character described comprising a member adapted to receive a peripheral portion of a wheel, means for supporting said member in outstanding relation to the wall of a car, and means carried by said supporting means and engaging the felly bolts of the wheel whereby to hold the wheel against circumferential movement.

6. A loading deck of the character described, comprising a supporting member, means for securing one end of the supporting member to the side of a freight car, said supporting member at the opposite end engaging the frame of the vehicle, and a wheel engaging member carried by said supporting member intermediate the ends thereof and engaging the wheel of the vehicle.

7. A loading deck of the character described, comprising a supporting member, means for securing said supporting member to the wall of a car, said supporting member engaging the car inwardly of the wheels thereof, and means carried by the supporting member and engaging the vehicle wheel whereby to cushion the vehicle on said supporting means.

8. A loading deck of the character described, comprising a supporting member, means for securing one end of the member to a wall of a car, said member at the opposite end engaging the frame of the vehicle, an arcuate member carried by the supporting member and engaging the periphery of the vehicle wheel, and means for holding the vehicle in outstanding relation to the wall of the car and against longitudinal and lateral movement with respect thereto.

9. A loading deck of the character described, comprising a vehicle supporting member, means for securing the member to one wall of a car, said member engaging the vehicle inwardly of the wheels thereof, and V-shaped bracing means engaging the spindle of the vehicle whereby to hold the spindle in outstanding relation to the wall of the car and also against lateral and longitudinal movement with respect thereto.

10. A loading deck of the character described, comprising means secured to the vertical wall of the car and engaging the frame of the vehicle whereby to suspend the vehicle from the wall of the car, a pair of outwardly converging bracing members engaging the spindle of the vehicle whereby to hold the vehicle against lateral and longitudinal movement, and means engaging the vehicle wheel for holding the wheel against circumferential movement.

11. A loading deck of the character described, comprising a supporting member engaging the vehicle frame inwardly of the wheels thereof, means securing said supporting member to the side wall of a freight car, means carried by said supporting means and engaging the vehicle wheel, bracing means for holding the vehicle in outstanding relation to the side wall of the car and against longitudinal and lateral movement, and securing means engaging the vehicle wheel for holding the wheel against circumferential movement.

12. A vehicle loading device of the character described comprising a vertical support, a flexible vehicle supporting member secured to the vertical support and extending beneath the vehicle, and wheel engaging means carried by the member intermediate the ends thereof.

13. A vehicle loading device of the character described comprising a flexible vehicle supporting member secured to a freight car whereby to hold the vehicle in an elevated position, and a wheel engaging shoe carried by the member intermediate the ends thereof.

14. A vehicle loading device of the character described comprising a flexible vehicle supporting member suspended within a freight car and extending beneath the vehicle, wheel engaging means carried by the member intermediate the ends thereof, and bracing means engaging the vehicle for holding the vehicle against lateral or longitudinal movement.

15. A vehicle loading device of the character described comprising a vehicle supporting member disposed within a freight car above the floor thereof and having a portion thereof extended beneath the vehicle, and a wheel engaging shoe carried by said member intermediate the point of attachment of the member to the car and the portion extended beneath the vehicle.

16. A device for supporting a vehicle in a freight car or the like, comprising supporting elements secured to the car for holding a part of the vehicle in elevated position, said elements being directed obliquely with respect to the vertical plane and being crossed intermediate their ends, the elements at opposite sides of the crossing point being connected respectively to the car and to the vehicle, the inclination of the elements to the aforesaid vertical plane assisting in preventing movement of the vehicle longitudinally in the car.

17. In combination with a freight car or the like, of a vehicle in the car, a support for engaging the lower portion of a wheel of a vehicle for holding it in elevated position in the car, means extending upwardly at the inner side of the wheel and connecting the support to the vehicle inwardly of the wheel, and means connecting the support to the car at the outer side of the wheel, for holding the support and wheel in elevated position.

18. In combination, a freight car or the like, a vehicle in the car, means for supporting the lower portion of a wheel of the vehicle in elevated position, means extending upwardly at the outer side of the support and connected to an upper side of the car, and means extending upwardly from the inner side of the support and connected to the vehicle inwardly of the wheel.

19. In combination, a freight car or the like, a vehicle in the car, and means for supporting a wheel of the vehicle in elevated position, comprising a flexible member connected to the car, extending under the wheel for supporting it, and connected to a part of the vehicle inwardly of the wheel.

20. In combination with a freight car or the like, of a vehicle in the car, a device for supporting the vehicle in the car with a wheel thereof in elevated position, said device comprising a cradle for the elevated wheel, adapted to embrace lower portions of such wheel, and means for supporting such cradle in elevated position including means directly connecting the cradle to the car and to a part of the vehicle inwardly of the wheel.

21. In combination with a freight car or the like, of a vehicle in the car, a device for supporting the vehicle therein, with wheels thereof in elevated position, said device comprising individual cradles for receiving parts of the elevated wheels, flexible means suspending the cradles from upper parts of the car, and means connecting the cradles to the vehicle between the wheels.

22. The combination with a freight car or the like, of a vehicle in the car, a device for supporting the vehicle therein with a wheel thereof in elevated position, said device comprising means for engaging a lower portion of the wheel elevated, means connected to the car and the first means for supporting the latter, and means connecting such first means to the wheel axle inwardly of the wheel, said last mentioned connecting means extending upwardly at the inner side of the wheel from the lower portion of the latter.

23. The combination with a freight car or the like, of a vehicle in the car, a device for supporting the vehicle therein with a wheel thereof in elevated position, said device comprising means for engaging a portion of the wheel elevated, means connected to the car and the first means for supporting the latter, means connecting to first means and extending upwardly and being connected to the wheel axle inwardly of the wheel, and means for preventing sidewise movement of the vehicle when so supported.

24. The combination with a freight car or the like, of a vehicle in the car, a device for supporting the vehicle therein with a wheel thereof in elevated position, said device comprising a cradle for receiving a lower portion of the elevated wheel, means connected to the car and cradle for supporting the latter and wheel in elevated position, and means connected to the cradle and extending upwardly and connected to the axle of the wheel inwardly of the latter.

25. The combination of a freight car or the like, of a vehicle in the car, means for supporting the vehicle therein with a wheel in elevated position, said means comprising a flexible member connected to an upper part of the car, extending under the elevated wheel and connected to the vehicle wheel axle inwardly of such wheel.

26. The combination with a freight car or the like of a vehicle in the car and a device for mounting one end of the vehicle in elevated position with respect to the other end, said device comprising individual cradles for the wheels at opposite ends of the elevated axle, means connecting each cradle to an upper part of the car for supporting it in elevated position, and means connecting each cradle to the vehicle between said wheels.

In testimony whereof I hereunto affix my signature.

SHERMAN HICE.